United States Patent
Studerus et al.

(10) Patent No.: US 10,567,959 B2
(45) Date of Patent: Feb. 18, 2020

(54) SYSTEM AND METHOD FOR MANAGING APPLICATION DATA OF CONTACTLESS CARD APPLICATIONS

(71) Applicant: Kaba AG Group Innovation Management, Rümlang (CH)

(72) Inventors: Paul Studerus, Oberwenningen (CH); André Lüscher, Feldmeilen (CH)

(73) Assignee: KABA AG GROUP INNOVATION MANAGEMENT, Rümlang (CH)

( * ) Notice: Subject to any disclaimer, the term of this patent is extended or adjusted under 35 U.S.C. 154(b) by 23 days.

(21) Appl. No.: 15/118,811

(22) PCT Filed: Dec. 15, 2014

(86) PCT No.: PCT/EP2014/003353
§ 371 (c)(1),
(2) Date: Aug. 12, 2016

(87) PCT Pub. No.: WO2015/120873
PCT Pub. Date: Aug. 20, 2015

(65) Prior Publication Data
US 2017/0055101 A1 Feb. 23, 2017

(30) Foreign Application Priority Data

Feb. 17, 2014 (CH) ........................... 211/14

(51) Int. Cl.
*H04W 12/06* (2009.01)
*H04W 12/04* (2009.01)

(52) U.S. Cl.
CPC ........... *H04W 12/06* (2013.01); *H04W 12/04* (2013.01)

(58) Field of Classification Search
CPC ..... H04W 4/001; H04W 4/008; H04W 12/04; H04W 12/06
See application file for complete search history.

(56) References Cited

U.S. PATENT DOCUMENTS 8,255,687 B1    8/2012  Pelly et al.
2012/0123883 A1*  5/2012  Charrat ................ G06Q 20/204
                                                        705/17

(Continued)

FOREIGN PATENT DOCUMENTS

WO    WO 2011/092289 A1    8/2011

OTHER PUBLICATIONS

International Search Report and Written Opinion of the International Searching Authority for International Application No. PCT/EP2014/003353, dated Apr. 23, 2015, in 11 pages.

*Primary Examiner* — Muthuswamy G Manoharan
(74) *Attorney, Agent, or Firm* — Knobbe, Martens, Olson & Bear, LLP

(57) ABSTRACT

For managing application data of different contactless card applications for a plurality of mobile communication devices (2), a card emulation module and application data for contactless card applications are transferred (S2, S3) by a computer system (1) to one of the mobile communication devices (2). The card emulation module is configured to control the mobile communication device (2) to emulate a contactless card module and to execute data transactions (S6, S7) via a close range wireless communication interface of the mobile communication device (2) using the application data. The computer system (1) maintains (S20, S30, S40, S50, S60) for the mobile communication devices (2) a card database with representations of the card emulation modules and their application data. The computer system (1) makes it possible to manage centrally and flexibly the application data of different contactless card applications and different application providers for a plurality of mobile communication devices (2).

17 Claims, 2 Drawing Sheets

(56) References Cited

U.S. PATENT DOCUMENTS

| | | | |
|---|---|---|---|
| 2012/0300932 A1* | 11/2012 | Cambridge | H04L 9/3234 380/270 |
| 2014/0359714 A1* | 12/2014 | Pluss | G06F 12/1475 726/4 |
| 2015/0220989 A1* | 8/2015 | Hayes | G06Q 30/0261 705/14.35 |

* cited by examiner

SYSTEM AND METHOD FOR MANAGING APPLICATION DATA OF CONTACTLESS CARD APPLICATIONS

FIELD OF THE INVENTION

The present invention relates to a system and a method for managing application data of different contactless card applications. Specifically, the present invention relates to a system and a method for managing application data of different contactless card applications for a plurality of mobile communication devices which comprise a close range wireless communication interface.

BACKGROUND OF THE INVENTION

Mobile communication devices are increasingly equipped with close range wireless communication interfaces for performing wireless data transactions with external transaction devices that are located in close proximity of the mobile communication devices. For example, the close range wireless communication interfaces include Near Field. Communication (NFC) modules for a range of a few inches, and/or Bluetooth communication modules for a range of a few meters. There is also available an established infrastructure of transaction devices, such as readers for interacting with contactless cards, i.e. chip cards, so called smartcards or Integrated Circuit Cards (ICC), equipped with RFID (Radio Frequency Identifier) transceivers. This infrastructure of transaction devices makes it possible to implement a variety of different applications on the basis of the contactless cards. Examples of such contactless card applications include access control, electronic ticketing, debit payment, credit payment, electronic cash payment, accounting of print/copy costs, stand-alone locks, hotel and campus applications, etc. Corresponding functions of contactless cards are increasingly being implemented into mobile communication devices, e.g. into mobile radio telephones, tablet computers, notebook computers or other portable personal computers and communication devices. Thus, instead of carrying and using one or more contactless cards, users may more conveniently use their mobile communication devices to interact with transaction devices. Typically, however, the contactless cards as well as their corresponding implementation in mobile communication devices support only one contactless card application. For a user this may be quite inconvenient, because only one card may be active at a time and the user has to actively switch between different cards whenever another application is to be used. Furthermore, in a powered off state of a mobile communication device, only one "default" card is active (NFC cards), and, thus, only the application of that particular card is available to the user. If more than one application are to be implemented on a contactless card or a corresponding implementation in a mobile communication device, all applications must be implemented at the time when the card is being personalized using an authorizing implementation key. Consequently, these applications would all be provided and implemented by the same entity, with very little or no flexibility of the timing of implementation and modification of applications.

U.S. Pat. No. 8,255,687 describes a system for enabling users to select from available secure service providers for provisioning applications and services on a secure element installed on a device of the user. According to U.S. Pat. No. 8,255,687, the secure element is a piece of hardware, e.g. removable card or a chip such as a SIM card or microSD card, which is installed on a user's communication device. A secure element generally includes its own operating environment with a tamper-proof microprocessor, memory, and operating system. The secure element has one or more keys that are typically installed at manufacture time. A corresponding key is shared by a Trusted Service Manager (TSM) enabling the TSM to establish a cryptographically secure channel to the secure element for installation, provisioning, and personalization of the secure element while the device having the secure element is in the possession of an end user. The device includes a service provider selector (SPS) module that enables a user to select a secure service provider. The SPS module communicates with a key escrow service that distributes cryptographic keys for the secure element to the user selected secure service provider, or with a central TSM that provisions applications and services on behalf of the user selected secure service provider. The NEC controller of the user's device relies on the secure element to provide a secure operation environment for financial transactions, transit ticketing, identification and authentication, physical security access, and other functions. For example, the NFC controller interacts securely with the secure element to obtain payment credentials from the secure element and provide those credentials to an NEC-enabled point of service via the device's NFC antenna.

US 2012/0300932 describes systems and methods for encrypting mobile device communications. As explained in US 2012/0300932, mobile devices may include both shared memory space and one or more secure elements. According to US 2012/0300932, the secure element is a computer-readable storage in the memory of the mobile device or any securitized medium having memory, such as a Universal Integrated Circuit Card ("UICC"), Subscriber Identity Module ("SIM"), and the like. The secure element may include functionality for receiving messages, such as transaction messages, from shared memory applications, encrypting the received messages, and providing the encrypted messages back to the shared memory applications. For example, a mobile wallet may be stored in the shared memory and the secure element may include a security application or an authentication application that receives a message from the mobile wallet. The security application may utilize any number of suitable encryption techniques to encrypt the message, and the secure application of the secure element may provide the encrypted message back to the mobile wallet. The mobile wallet may then transmit or otherwise communicate the message to a recipient, such as a merchant or a trusted service manager ("TSM"). In a similar manner, the mobile wallet may provide received messages to the security application of the secure element for decryption. Using NFC technology of the mobile device, applications may also enable transactions. A Trusted Services Management computer communicates with the mobile devices and facilitates management of application space on the secure element, and checking of the status of the mobile device and its secure elements and applications, such as active, locked, unlocked, or terminated.

SUMMARY OF THE INVENTION

It is an object of this invention to provide a system and a method for managing application data of different contactless card applications, which system and method do not have at least some of the disadvantages of the prior art. In particular, it is an object of the present invention to provide a system and a method for managing application data of different contactless card applications for a plurality of mobile communication devices, whereby the applications do not need to be implemented in a mobile communication device at the same time or by the same application provider.

According to the present invention, these objects are achieved through the features of the independent claims. In addition, further advantageous embodiments follow from the dependent claims and the description.

According to the present invention, the above-mentioned objects are particularly achieved in that a computer system is provided for managing application data of different contactless card applications for a plurality of mobile communication devices. The computer system comprises one or more processors configured to: transfer via a telecommunications network to one of the mobile communication devices a card emulation module, using an area access key for storing the card emulation module in a secured area of the mobile communication device. The card emulation module comprises computer program code configured to control a processor of the mobile communication device to emulate a contactless card module and to execute data transactions via a close range wireless communication interface of the mobile communication device. The processors of the computer system are further configured to transfer application data for at least one contactless card application via the telecommunications network to the mobile communication device for storing the application data in the card emulation module. Furthermore, the processors of the computer system are configured to maintain in the system a card database and storing in the card database for each of the plurality of mobile communication devices a representation of the card emulation module stored in the respective mobile communication device.

Providing a computer system for installing and managing in the mobile communication devices a card emulation module and application data makes it possible to manage centrally for a plurality of mobile communication devices the application data of different contactless card applications and different application providers. The computer system provides a centralized platform that makes it possible to flexibly manage, store, and change the application data of different contactless card applications and different application providers at variable points in time, for individual or groups of mobile communication devices, as requested or needed by the application providers or users of the mobile communication devices, for example, and without a limitation to the time of personalization of a card or restriction to a single application provider. Thus, the computer system makes it possible to implement and manage flexibly and efficiently several different contactless card applications from several different application providers (partners) in one common card emulation module on a mobile communication device. Consequently, users of a mobile communication device have the advantage of both a multi-application and multi-provider card, combining contactless card applications for private and business use, different purposes and different providers in one card that can be kept active and used at any time, regardless of the availability of battery power in the mobile communication device. For example, a user may install and use in one single card an access control application for his home, an access control application for his work place, a ticketing application for public transport, a subscription application for a fitness studio, a debit application for a cafeteria, and debit applications for different vending machines, etc.

In an embodiment, the processors of the system are further configured to transfer application-specific access right data for a plurality of contactless card applications via the telecommunications network to the mobile communication device for storing the application-specific access right data in the card emulation module, and to store in the system application-specific access keys for a plurality of contactless card applications. The card emulation module comprises computer program code configured to control the processor of the mobile communication device to execute data transactions via the close range wireless communication interface of the mobile communication device, and to verify authorization of a transaction partner (transaction entity, transaction device) to access application data stored in the card emulation module for a particular contactless card application, based on the application-specific access right data, stored in the card emulation module for the particular contactless card application, and an application-specific access key, received from the transaction partner via the close range wireless communication interface. This embodiment makes it possible to execute off-line data transactions for a contactless card application, without the need to access the card database of the computer system for accessing application data.

In another embodiment, the application data stored in the card emulation module of the mobile communication device comprises a pointer to application data stored in the card database. The card emulation module comprises computer program code configured to control the processor of the mobile communication device to retrieve the application data from the card database using the pointer, and to execute the data transactions via the close range wireless communication interface of the mobile communication device using application data retrieved from the card database. This embodiment makes it possible to execute on-line data transactions for a contactless card application, without the need to transfer and store application data content locally in the card emulation module of the mobile communication devices.

In an embodiment, the processors of the system are further configured to read the application data stored in the card emulation module of one of the mobile communication devices, and to execute at least one of: transferring from the system to the mobile communication device up-to-date application data stored in the card database, in cases where the application data read from the mobile communication device indicates an outdated version of the application data, and updating in the system the representation of the card emulation module of the mobile communication device by storing in the card database application data read from the card emulation module of the mobile communication device, in cases where the application data read from the mobile communication device indicates a more recent version of the application data. Consequently, by performing read operations periodically or on request, the application data stored centrally in the card module representations in the card database of the computer system is synchronized with the application data stored in the card emulation module of the mobile communication devices.

In another embodiment, the processors of the computer system are further configured to receive via the telecommunications network a request related to a contactless card application for performing at least one of the following application data operations for the card emulation module of one or more mobile communication devices: download additional application data into the card emulation module, update application data in the card emulation module, and delete application data in the card emulation module. Depending on the scenario, an application data request is initiated by an authorized partner system or an associated application entity, or by the mobile communication device, for example. The processors of the computer system are further configured to transfer an application data request to the card emulation module of the one or more mobile communication devices according to the respective application data operation, and to update in the card database the representation of the card emulation module of the one or more mobile communication devices by updating application data in the card database according to the application data request. Consequently, with every application data request and executed application data operation, the application data stored centrally in the card module representations in the card database of the computer system is synchronized with the application data stored in the card emulation module of the mobile communication devices.

In an embodiment, the processors of the computer system are further configured to receive via the telecommunications network from an authorized partner system a write request, including application data for the card emulation module of one or more mobile communication devices, and/or a read request for reading application data from the card emulation module of one or more mobile communication devices; to transfer the application data via the telecommunications network to the card emulation module of the one or more mobile communication devices, in case of a write request; and to read the application data stored in the card emulation module of the one or ore mobile communication devices, in case of a read request; and to update in the system the representation of the card emulation module of the one or more mobile communication devices by storing in the card database the application data read or stored in the card emulation module of the one or more mobile communication devices, respectively. Thus, a partner system may at any time read and/or write application data associated with its contactless card application(s) from the card emulation module of one or more mobile communication devices.

In another embodiment, the processors of the computer system are further configured to receive via the telecommunications network a request related to one of the mobile communication devices, the request demanding an update to the card emulation module. Depending on the scenario, a card update request is initiated by an authorized partner system or an associated application entity, or by the mobile communication device, for example. The processors of the computer system are further configured to transfer program code for the card emulation module to the mobile communication device according to the request; and to update in the card database the representation of the card emulation modules of the mobile communication devices by storing in the card database a version number, indicating the version of the program code transferred to the mobile communication device, and/or the program code transferred to the mobile communication device. Thus, the program module of a card emulation module can be updated at any time with up-to-date program code, making it possible for the computer system to upgrade or correct the program modules of one or mobile communication devices, while maintaining in the card database a synchronized representation of the card emulation modules affected.

In an embodiment, the card emulation module comprises computer program code configured to control a processor of the mobile communication device to execute the data transaction via the close range wireless communication interface of the mobile communication device with an external transaction device, the data transaction including a debit payment transaction, a credit payment transaction, an electronic cash payment transaction, a ticketing transaction, an access control transaction, an application update transaction for updating the application data in the card emulation module, and/or a card update transaction for updating the computer program code of the card emulation module; and the application data including debit account data, credit account data, electronic cash data, electronic ticket data, access right data, user identification data, user authentication data, and/or application data structure data.

In addition to the system for managing application data of different contactless card applications for a plurality of mobile communication devices, the present invention also relates to a computer-implemented method of managing application data of different contactless card applications for a plurality of mobile communication devices, the method comprising: transferring by a computer system via a telecommunications network to one of the mobile communication devices a card emulation module, using an area access key for storing the card emulation module in a secured area of the mobile communication device, the card emulation module comprising computer program code configured to control a processor of the mobile communication device to emulate a contactless card module and to execute data transactions via a close range wireless communication interface of the mobile communication device; transferring by the computer system via the telecommunications network to the mobile communication device application data for at least one contactless card application for storing the application data in the card emulation module; and maintaining in the computer system a card database, storing in the card database for each of the plurality of mobile communication devices a representation of the card emulation module stored in the respective mobile communication device.

In addition to the computer system and computer-implemented method for managing application data of different contactless card applications for a plurality of mobile communication devices, the present invention also relates to a computer program product comprising a non-transient computer readable medium having stored thereon computer program code configured to control a processor of a computer system to perform the steps of: transferring from the computer system via a telecommunications network to one of the mobile communication devices a card emulation module, using an area access key for storing the card emulation module in a secured area of the mobile communication device, the card emulation module comprising computer program code configured to control a processor of a mobile communication device to emulate a contactless card module and to execute data transactions via a close range wireless communication interface of the mobile communication device; transferring from the computer system via the telecommunications network to the mobile communication device application data for at least one contactless card application for storing the application data in the card emulation module; and maintaining in the computer system a card database, by storing in the card database for each of the plurality of mobile communication devices a representation of the card emulation module stored in the respective mobile communication device.

BRIEF DESCRIPTION OF THE DRAWINGS

The present invention will be explained in more detail, by way of example, with reference to the drawings in which.

DETAILED DESCRIPTION OF THE PREFERRED EMBODIMENTS

Figure 1:
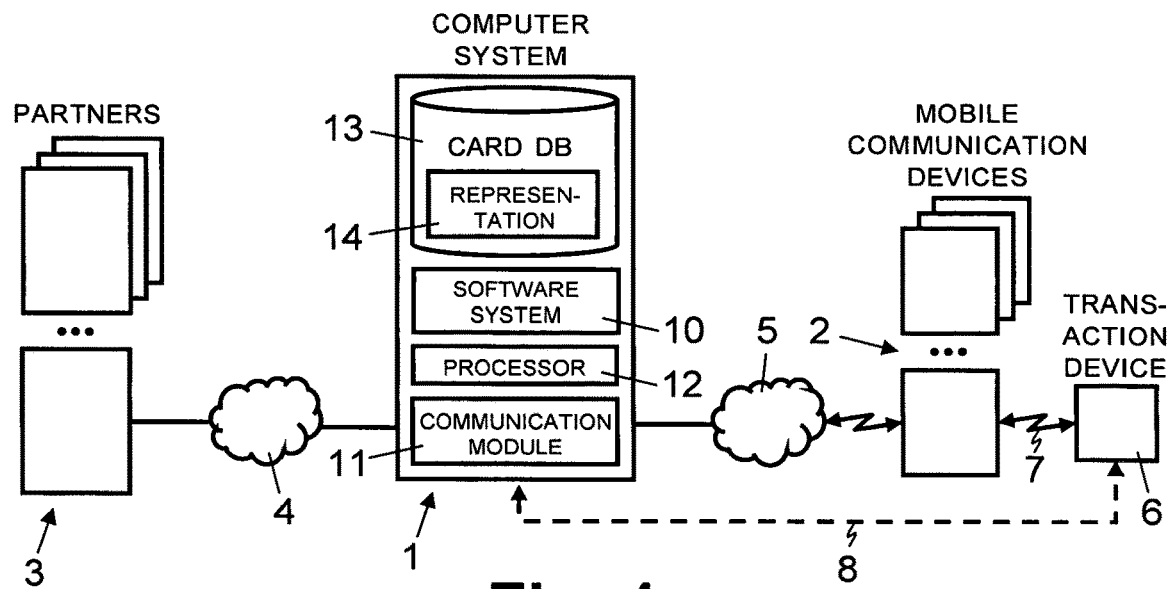
FIG. 1: shows a block diagram illustrating schematically a system for managing application data of different contactless card applications for a plurality of mobile communication devices.
Figure 3:
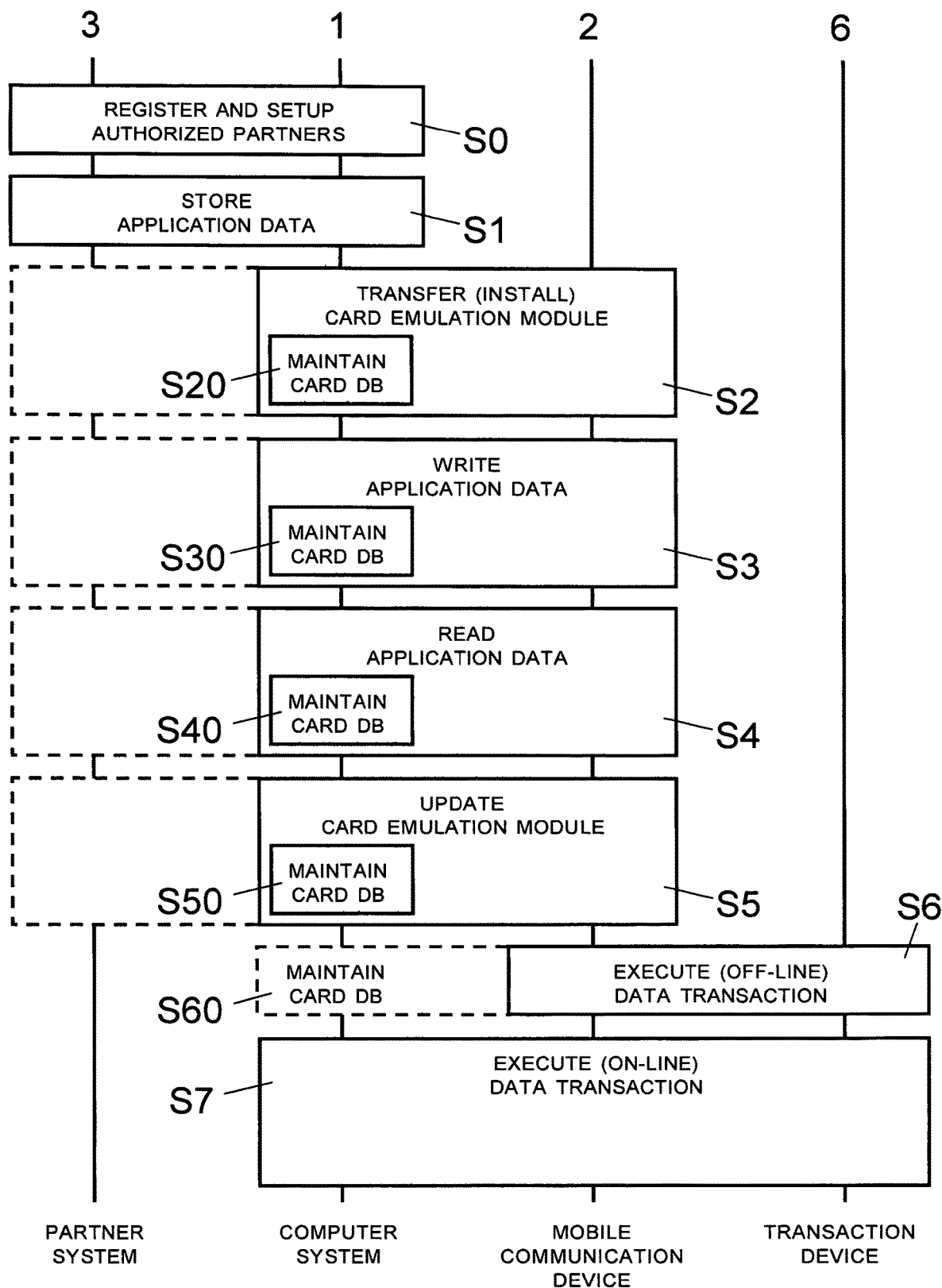
FIG. 3: shows a flow diagram illustrating an exemplary sequence of steps for managing application data of different contactless card applications for a mobile communication device.

In FIGS. 1 and 3, reference numeral 1 refers to a computer system for managing application data of different contactless card applications for a plurality of mobile communication devices 2.

Contactless card applications include various types of transactions utilizing smart or chip cards with wireless communication capabilities. The transactions are performed between a contactless card and a card reader (external transaction entity or transaction device) comprising a corresponding wireless communication interface. The transactions include the exchange of application data between the contactless card and the card reader in so called application protocol data units (APDU). For example, contactless card applications include debit payment transactions, credit payment transactions, electronic cash payment transactions, ticketing transactions, access control transactions, and authentication transactions. Accordingly, the application data associated with these contactless card applications include debit account data, credit account data, electronic cash data, electronic ticket data, access right data, user authentication data, and user identification data.

The computer system 1 comprises one or more operable computers with one or more processors 12. The computer system further comprises 1 a communication module 11 configured for data communication with partner systems 3 and mobile communication devices 2 via a telecommunications network 4, 5. The telecommunications network 4, 5 includes fixed line communication networks and/or mobile radio communication networks, e.g. a GSM-network (Global System for Mobile communication), a UMTS-network (Universal Mobile Telephone System) or another mobile radio telephone system, and/or a WLAN (Wireless Local Area Network) for accessing the Internet. In an embodiment, the telecommunications network 4 includes fixed, dedicated lines between the computer system 1 and a partner system 3. In a further embodiment, the telecommunications network 5 includes over the air replication systems for transmitting data from the computer system 1 to the mobile communication devices 2 (store and forward approach). In yet a further embodiment, indicated by communication path 8, the communication module 11 of the computer system 1 is further configured for data communication with transaction devices 6, e.g. via a telecommunications network 4, 5.

Each of the partner systems 3 comprises one or more operable computers including one or more processors. The partner systems 3 are associated with authorized partners of the provider of the computer system 1. The partner systems 3 are provided with cryptographic access keys for an authorized access to the computer system 1, at least to a defined area, defined contactless card applications, and/or defined services of the computer system 1 assigned to the partner or partner system 3, respectively. Thus, the computer system 1 manages and maintains the (read and/or write) access rights of its partners or partner systems 3, respectively, with regards to their contactless card applications and related application data. Specifically, the computer system 1 manages and maintains application-specific (read and/or write) access rights of its partners or partner systems 3, respectively, and their associated entities, e.g. application-specific back-end systems and transaction devices 6 (transaction entities).

Figure 2:
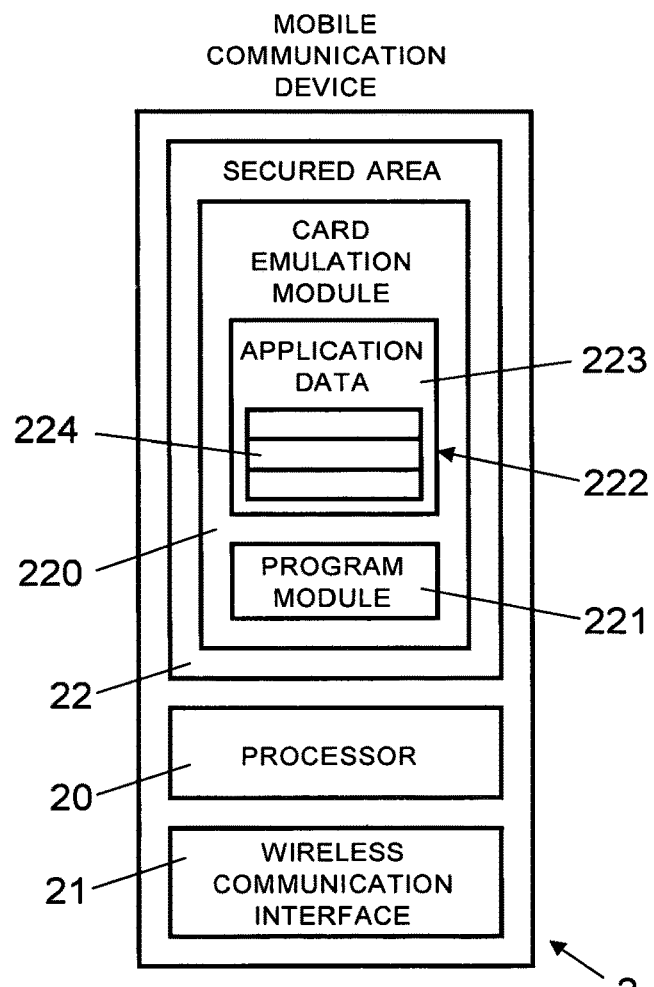
FIG. 2: shows a block diagram illustrating schematically a mobile communication device with a wireless communication interface, a processor, a card emulation module, and application data.

As illustrated in FIG. 2, the mobile communication devices 2 each comprise a processor 20 and, connected to the processor 20, a wireless communication interface 21 and a program/data store with a secured area 22. The wireless communication interface 21 is configured for close range wireless data communication with transaction devices 6 arranged externally to the mobile communication device 2, e.g. card readers with a corresponding wireless communication interface 21. For example, the wireless communication interface 21 comprises a Near Field Communication (NFC) module, e.g. based on existing RFID standards such as ISO/IEC 14443 and ISO/IEC 18092 for a range of a few inches, and/or a Bluetooth communication module (originally defined in IEEE 802.15.1) for a range of a few meters. As further illustrated in FIG. 2, stored in the secured area 22 is a card emulation module 220. The card emulation module 220 comprises a program module 221 and application data 222.

In addition to the application data associated with the contactless card applications described above, the application data 222 of the card emulation module 220 further comprises application data structure data 223 associated with the contactless card applications. The application data structure data 223 defines for one or more specific contactless card applications the respective data structure used to organize and store the actual application data content 224 of the contactless card application. The actual application data content 224 includes numeric, alphanumeric and cryptographic values which are accessed, stored, and/or processed by the contactless card application. In other words, the application data structure data 223 defines the file system for a specific contactless card application. The application data 222 of the card emulation module 220 further comprises application identifiers and time stamps assigned to the application data of the different contactless card applications. Depending on the scenario or the embodiment, rather than the actual application data content 224, for at least one contactless card application, the application data 222 of the card emulation module 220 comprises a pointer to application data stored in a card database 13 of the computer system 1, as indicated by the data structure data 223. As the card emulation module 220 comprises application data 222 for a plurality of different applications, the card emulation module 220 comprises application-specific access right data. The application-specific access right data is stored as part of the application data 222 of the respective application, e.g. in the header of a segment, data record, or data file of the respective application. In other words, the application data 222 comprises for each of the applications supported by the card emulation module 220 a respective segment, data record, or data file that includes the application-specific access right data. The application-specific access right data defines for a requesting entity with a corresponding application-specific access key the actual rights for reading and/or writing the application data of a particular application. Depending on the embodiment, the actual right of a requesting entity for reading and/or writing the application data of a particular application supported by the card emulation module 220 is determined from the application-specific access right data included in the segment, data record, or data file of the respective application in the application data 222 and from the application-specific access key provided by the requesting entity, e.g. based on a simple comparison or by using a cryptographic function. For a secure data exchange the card emulation module 220 uses data encryption such as AES 128, AES256, 3DES, or the like.

The program module 221 comprises computer program code configured to control the processor 20 of the mobile communication device 2 to emulate a contactless card module and to execute data transactions via the close range wireless communication interface 21 of the mobile communication device 2. Specifically, the card emulation module 220 or its program module 221 are configured to control the processor 20 to emulate the functions of a hardware-implemented smart card, i.e. a chip card or integrated circuit card comprising a processor and memory (RAM, ROM), for example an RFID card for interacting with a card reader according to a standardized NEC or RFID protocol as defined in standards such as ISO 18092, ISO 21481, ISO 15693, or ISO 14443, or according to a proprietary data transmission, NEC or RFID protocol. Particularly, the card emulation module 220 or its program module 221, respectively, is configured to control the processor 20 to access the application data 222, specifically, to read and/or write the application data content 224 of a specific contactless card application using the respective application data structure data 223. In the context of a contactless card application, the card emulation module 220 or its program module 221 are configured to control the processor 20 to execute data transactions with an external transaction device 6 via the close range wireless communication interface 21 of the mobile communication device 2, using the application data 222 associated with the respective contactless card application.

In an embodiment, the card emulation module 220 or its program module 221, respectively, is configured to control the processor 20 to execute with the external transaction device 6 via the close range wireless communication interface 21 a card update transaction, receiving computer program code for updating the computer program code of the card emulation module 220. For that purpose, the program module 221 has a fixed part and a variable part, whereby the fixed part is configured to execute the card update transaction for adding, replacing, and/or removing at least part of the computer program code of the variable part.

As mentioned above and illustrated in FIG. 1, the computer system 1 comprises a card database 13 configured to store for a plurality of mobile communication devices 2 a representation 14 of the card emulation module 220 implemented in the respective mobile communication device 2. As shown below in Table 1, each representation 14 includes a unique card identifier for identifying the card, information about the program module 221, and application data 222 of a card emulation module 220. Specifically, the representation 14 includes a copy of the computer program code of the program module 221 and/or a program identifier identifying the program and its version and, thus, the computer program code of the program module 221 (in the latter case the program identifier refers to a copy of the actual computer program code of the respective program module 221 which is stored in the computer system 1). Furthermore, the representation 14 includes a copy of the application data structure data 223 and/or an application identifier identifying the contactless card application and the data structure of its application data, and a copy of the actual application data content 224 and application-specific access right data, e.g. in the header of the segment, data record, or data file that contains the application data content 224 of the respective application. The representation 14 of a specific card emulation module 220 and/or its card identifier, respectively, are stored in the card database 13 assigned to the respective mobile communication device 2 and/or to a specific subscriber or user. For example, the card emulation modules 220 and/or the mobile communication devices 2 are identified by way of an International Mobile Equipment Identifier (IMEI). For example, the specific subscriber or user is identified by way of an International Mobile Subscriber Identifier (IMSI) and is associated with further subscriber or user information, such as name, address, Mobile Subscriber ISDN Number (MSISDN), etc. The card database 13 further comprises time stamps assigned to the application data of the different contactless card applications.

TABLE 1

Representation of a card emulation module of a specific mobile communication device

|  |  |  | Program code | |
|---|---|---|---|---|
|  | Program module | Program identifier | Program code of fixed part | Program code of variable part |
| Card identifier | Application data A | Application identifier A | Data structure of application data A | Application data content A |
|  | . . . | . . . | . . . | . . . |
|  | Application data N | Application identifier N | Data structure of application data N | Application data content N |

The computer system 1 further comprises a software system 10 including computer program code configured to control the processor(s) 12 of the computer system 1 to execute various functions as described below in more detail. By way of the software system 10 the processor(s) 12 of the computer system 1 is/are controlled, and thus configured, to maintain the card database 13 and the representations 14 of the card emulation modules 220. Furthermore, the software system 10 or its processor(s) 12, respectively, is/are configured to process card and/or application related requests received by the communication module 11 via a telecommunications network 4,5 from authorized mobile communication devices 2, partner systems 3, and/or application related computer systems associated with the partner systems 3, e.g. transaction devices 6, such as card readers, or computerized application servers connected to the transaction devices 6 and/or the telecommunications networks 4,5.

The requests from the partner systems 3 include write requests with application data for one or more mobile communication devices 2 (including application-specific access right data), read requests for reading application data from one or more mobile communication devices 2, and requests for updating the card emulation module 220, particularly the respective program module 221, of one or more mobile communication devices 2. The write requests include requests for downloading additional application data into the card emulation module 220, updating application data 222 in the card emulation module 220, and deleting application data 222 in the card emulation module 220.

The requests from a mobile communication device 2 or an application related computer system associated with a partner system 3 include requests related to performing application data operations for the card emulation module 220 of the respective mobile communication device 2, and requests related to updating the card emulation module 220, particularly the respective program module 221, of the respective mobile communication device 2. The application data operations include downloading additional application data into the card emulation module 220, updating application data 222 in the card emulation module 220, and deleting application data 222 in the card emulation module 220.

TABLE 2

| Requester | Request | Operation | Data Source | Data Sink |
|---|---|---|---|---|
| Partner system (or associated entity) | Write | Download new application data into card emulation module | Partner system via computer system | One or more mobile communication devices |
| | | Update application data in the card emulation module | | |
| | | Delete application data in the card emulation module | — | |
| | Read | Read application data from card emulation module | One or more mobile communication devices | Computer system, partner system |
| | Update | Update program module of card emulation module | Partner system via computer system | One or more mobile communication devices |

Table 2 above gives an overview of various requests from a partner system 3 and the associated operations and entities:

The following Table 3 gives an overview of various requests from a mobile communication device 2 and the associated operations and entities:

TABLE 3

| Requester | Request | Operation | Data Source | Data Sink[1] |
|---|---|---|---|---|
| Mobile communication device | Application data operation | Download new application data into card emulation module | Computer system | Respective mobile communication device |
| | | Update application data in the card emulation module | | |
| | | Delete application data in the card emulation module | — | |
| | Update | Update program module of card emulation module | Computer system | Respective mobile communication device |

[1]Update of card database and partner system not included

The following Table 4 gives an overview of various requests from a transaction device 6 and the associated operations and entities:

TABLE 4

| Requester | Request | Operation | Data Source | Data Sink[1] |
|---|---|---|---|---|
| Transaction device | Write | Write new application data into card emulation module | Transaction device | Respective mobile communication device |
| | | Update application data in the card emulation module | | |
| | | Delete application data in the card emulation module | — | |
| | Read | Read application data from card emulation module | Respective mobile communication device | Transaction device |

TABLE 4-continued

| Requester | Request | Operation | Data Source | Data Sink[1] |
|---|---|---|---|---|
| | Update | Update program module of card emulation module | Computer system | Respective mobile communication device |

[1]Update of card database and partner system not included

In the following paragraphs, described with reference to FIG. 3 are possible sequences of steps performed by the computer system 1, the communication device(s) 2, the partner system(s) 3, and the transaction device(s) 6 or other application related computer system(s) associated with the partner system(s) 3.

In preparatory step S0, authorized partners or the respective partner systems 3, respectively, are set up and registered in the computer system 1. For example, the software system 10 generates cryptographic authorization elements, e.g. authorization keys, for the respective partners or their partner systems 3, respectively. Depending on the scenario and/or configuration, the authorization elements relate to one or more contactless card applications which are governed and/or provided by the respective partner or partner system 3, or other computer systems associated with the partner system 3. Thus, by way of the authorization elements, the respective partner is authorized to access and modify application data of one or more contactless card applications managed by the computer system 1. The software system 10 registers the authorized partners and their authorization elements in the computer system 1.

In step S1, an authorized partner stores application data in the computer system 1. Specifically, after authentication of the authorization elements, the software system 10 receives and accepts from the partner system 3 a request to store application data for a particular contactless card application, implemented in a card emulation module 220 of one or more mobile communication devices 2. The software system 10 stores the request for the particular contactless card application together with the application data in the computer system 1. The software system 10 returns to the respective partner system 3 a receipt of the write request. The actual writing of the application data into the card emulation module 220 of one or more mobile communication devices 2 will be described later in the context of step S3. In an embodiment, the software system 10 generates for the particular contactless card application application-specific access keys, representing application-specific (read and/or write) access rights for the respective partner or partner system 3, or other computer systems associated with the partner system 3, e.g. application-specific back-end systems and transaction devices 6, to read and/or write the application data of the particular contactless card application. Furthermore, the software system 10 generates the corresponding application-specific access right data for controlling read and/or write access to application data of the particular contactless card application. While the application-specific access keys are transferred in a secured fashion to those entities that are authorized to access application data of the respective contactless card application, the corresponding application-specific access right data is stored with the application data of the respective contactless card application, i.e. in the card emulation module 220.

In step S2, the computer system 1 installs a card emulation module 220 in the mobile communication device 2. Depending on the scenario or embodiment, installing the card emulation module is initiated by request of the mobile communication device 2, the computer system 1, the partner system 3, a transaction device 6 interacting with the mobile communication device 2, or another authorized application related computer system associated with the partner system 3. Specifically, the software system 10 transfers the card emulation module to the mobile communication device 2. The card emulation module is transferred over the air via the telecommunications network 5, or via communication path 8 through the wireless communication interface of the transaction device 6 interacting with the mobile communication device 2. In its request for storing the card emulation module 220 in a secured area 22 of a data store of the mobile communication device 2, the software system 10 includes an area access key. Upon verification of the area access key, directed by the program code of a control module, the processor 20 of the mobile communication device 2 stores the card emulation module 220 in the secured area 22. As described above, the card emulation module 220 includes the program module 221. Depending on the scenario and/or embodiment, the card emulation module 220 includes at least some application data 222 when it is transferred and installed in the mobile communication device 2, or the application data 222 is transferred later in a separate step. As described above, the application data written into the card emulation module 220 further comprises for each application application-specific access right data that is included as part of the application data of a particular application, e.g. in the header of a segment, data record, or data file of the application data of the particular application. The access right data is later used to control read and/or write access to the application data of a particular application, i.e. the right to read and/or write data from or into the segment, data record, or data file holding the application data of the particular application. Upon successful installation of the card emulation module 220, the processor 20 returns to the computer system 1 an installation confirmation message.

In step S20, upon receiving an affirmative installation confirmation message, the software system 10 stores in the card database 13 an up-to-date representation 14 of the card emulation module 220 installed in the respective mobile communication device 2. Particularly, the representation 14 corresponds with the version of the program module 221 and, if applicable, the application data structure data 223 and application data content 224 of the application data 222 in the card emulation module 220 (including the application-specific access right data). Depending on the embodiment and/or context, the software system 10 forwards a related installation confirmation message to the respective partner system 3 that requested the installation of the card emulation module.

In step S3, the computer system 1 writes (new, additional, or modifying) application data into the card emulation module 220 of the mobile communication device 2. As described above, the application data written into the card emulation module 220 includes application data structure data 223 which indicates the data structure of the application data associated with a particular contactless card application or a pointer to the card database 13 of the computer system 1. Thus, depending on the scenario and/or embodiment, the application data written into the card emulation module 220 further comprises the actual application data content or the actual pointer to application data stored in the card database 13 of the computer system 1. Depending on the scenario or embodiment, writing the application data into the card emulation module 220 is initiated by request of the mobile communication device 2, the computer system 1 (e.g. corresponding to a stored and pending request received from the partner system 3), the partner system 3, the transaction device 6 interacting with the mobile communication device 2, or another authorized application related computer system associated with the partner system 3. Specifically, the software system 10 transfers the application data to the mobile communication device 2. The application data is transferred over the air via the telecommunications network 5, or via communication path 8 through the wireless communication interface of the transaction device 6 interacting with the mobile communication device 2. In its request for storing the application data into the card emulation module 220, the software system 10 includes an application access key. Specifically, for writing application data content into the card emulation module 220, the software system 10 includes an application-specific access key in the write request. The application-specific access key is provided by the entity initiating the write request (the mobile communication device 2, the computer system 1, the partner system 3, the transaction device 6, or another authorized application related computer system associated with the partner system 3, e.g. an application specific back-end system) and/or by the computer system 1 on behalf of the initiating entity, upon successful authorization of that entity by the computer system 1 based on other authorization elements provided by the initiating entity. Upon verification of the application access key, directed by the program code of the program module 221, the processor 20 of the mobile communication device 2 stores the application data in the card emulation module 220. Specifically, the card emulation module 220 or the processor 20 as directed by the program module 221, respectively, checks authorization for the write request based on the received application-specific access key and application-specific access right data stored in the card emulation module 220 as part of the respective application data 222 of the particular application. Upon successful storage of the application data 222 in the card emulation module 220, the processor 20 returns to the computer system 1 a write confirmation message, e.g. via the same communication path used for the write request.

In step S30, upon receiving an affirmative write confirmation message, the software system 10 stores in the card database 13 an up-to-date representation 14 of the application data associated with the card emulation module installed in the respective mobile communication device 2. Particularly, the representation 14 corresponds with the application data structure data and application data content that is either stored in the card emulation module 220 or referenced by the pointer of the card emulation module 220. Depending on the embodiment and/or context, the software system 10 forwards a related write confirmation message to the respective partner system 3 that requested the writing of the application data.

In step S4, the computer system 1 reads application data 222 in the card emulation module 220 of the mobile communication device 2. Depending on the scenario or embodiment, reading the application data 222 in the card emulation module 220 is initiated by request of the computer system 1, the partner system 3, the transaction device 6 interacting with the mobile communication device 2, or another authorized application related computer system associated with the partner system 3. Specifically, the software system 10 transfers a read request to the mobile communication device 2. The read request is transferred over the air via the telecommunications network 5, or via communication path 8 through the wireless communication interface of the transaction device 6 interacting with the mobile communication device 2. In its read request, the software system 10 includes an application access key. Specifically, for reading application data content from the card emulation module 220, the software system 10 includes an application-specific access key in the read request. The application-specific access key is provided by the entity initiating the read request (the mobile communication device 2, the computer system 1, the partner system 3, the transaction device 6, or another authorized application related computer system associated with the partner system 3, e.g. an application specific back-end system) and/or by the computer system 1 on behalf of the initiating entity, upon successful authorization of that entity by the computer system 1 based on other authorization elements provided by the initiating entity. Upon verification of the application access key, directed by the program code of the program module 221, the processor 20 of the mobile communication device 2 reads the application data 222 in the card emulation module 220 and returns to the computer system 1 a read response message, e.g. via the same communication path used for the read request. Specifically, the card emulation module 220 or the processor 20 as directed by the program module 221, respectively, checks authorization for the read request based on the received application-specific access key and application-specific access right data stored in the card emulation module 220 as part of the respective application data 222 of the particular application. Depending on the scenario and/or embodiment, the application data 222 read from the card emulation module 220 and included in the read response comprises the actual data structure 223 and application data content 224, or the pointer to application data stored in the card database 13 of the computer system 1. In case the application data merely includes a pointer, the software system 10 uses the pointer to read the application data stored in the card database 13 of the computer system 1 and returns the read application data in a read response to the entity that initiated the read request.

In step S40, upon receiving the read response message with included actual data structure and application data content, the software system 10 checks whether the application data read from the card emulation module 220 is up-to-date or outdated. For that purpose, the software system 10 compares time stamps of the application data read from the card emulation module 220 of the mobile communication device 2 with corresponding time stamps of the application data stored in the representation 14 of the card emulation module in the card database 13. If the time stamps indicate that the application data read from the mobile communication device 2 indicates an outdated version, i.e. an older time stamp, the software system 10 updates the application data 222 in the card emulation module 220 of the mobile communication device 2. Specifically, the software system 10 transfers the respective application data stored in the card database 13 to the card emulation module 220 of the mobile communication device 2, as described above in the context of the write operation, e.g. via the same communication path used for the read request. On the other hand, if the time stamps indicate that the respective application data stored in the card database 13 is outdated, i.e. it has an older time stamp than the application data read from the mobile communication device 2, the software system 10 updates the application data stored in the card database 13. Thus, the software system 10 stores the application data 222 read from the card emulation module 220 of the mobile communication device 2 in the card database 13, specifically in the representation 14 of the respective card emulation module (including the application-specific access right data).

In step S5, the computer system 1 updates the card emulation module 220 of the mobile communication device 2, specifically, the program module 221 of the card emulation module 220. Depending on the scenario or embodiment, updating the program module 221 is initiated by request of the mobile communication device 2, the computer system 1 (e.g. corresponding to a stored and pending request received from the partner system 3), the partner system 3, the transaction device 6 interacting with the mobile communication device 2, or another authorized application related computer system associated with the partner system 3. In one scenario or embodiment, the software system 10 updates the program module 221 by reinstalling the program module 221, as described above in the context of step S2, by using an area access key and overwriting the program module 221 but maintaining the application data, or by overwriting the program module 221 and the application data 222. In another scenario or embodiment, the program module 221 is updated by performing a card update transaction which updates only a variable part of the program module 221. This latter approach is particularly useful when the card update transaction is performed by the external transaction device 6 via the close range wireless communication interface 21. Upon verification of an update key provided by the transaction device 6, the fixed part of the program module 221 directs the processor 20 of the mobile communication device 2 to receive and store the new variable part of the program module 221 in the card emulation module 220. Upon successful update of the program module 221, the processor 20 returns to the computer system 1 a card update message, e.g. via the same communication path used for the update request.

In step S50, upon receiving an affirmative card update message, the software system 10 stores in the card database 13 an up-to-date representation 14 of the card emulation module 220 installed in the respective mobile communication device 2. Particularly, the representation 14 corresponds with the version of the program module 221 and, if applicable, the application data structure data 223 and application data content 224 of the card emulation module 220, and includes the application-specific access right data.

In FIG. 3, reference numerals S6 and S7 refer to executing data transaction related to a contactless card application or an update of the card emulation module 220, i.e. an update of the program module 221 and/or the application data 222 as described above with reference to S5 and S50. The data transactions are executed between the card emulation module 220 of the mobile communication device 2 and the transaction device 6, provided that the card emulation module 220 and/or the transaction device 6 are authorized for the respective contactless card application or card update, respectively. For example, the card emulation module 220 and/or the transaction device 6 comprise access keys for accessing the application data associated with the respective contactless card application, or an authorization key for updating the card emulation module 220, respectively. As described above, the card emulation module 220 comprises application-specific access rights data stored as part of the application data 222 of the respective application. Authorization of the transaction device 6 to access the application data 222 of the particular application is determined based on the application-specific access key received from the transaction device 6 and the application-specific access rights data stored with the application data 222 of the particular application.

It should be noted that the computer system 1 manages and maintains the (read and/or write) access rights with regards to contactless card applications and related application data, not only for its partners or partner systems 3, respectively, but also for their associated entities, transaction devices 6, and users.

Reference numeral S6 refers to executing an off-line data transaction, using application data 222 stored in the card emulation module 220 of the mobile communication device 2. In the process of executing the off-line data transaction, the program module 221 of the card emulation module 220 transfers application data 222 of the card emulation module 220 via the wireless communication interface 7 to the transaction device 6, and receives and stores application data from the transaction device 6 in the card emulation module 220.

In step S60, the software system 10 stores in the card database 13 an up-to-date representation 14 of the card emulation module 220 installed in the respective mobile communication device 2, as described above with reference to S50. Depending on the embodiment or scenario, maintaining an up-to-date representation 14 of the card emulation module 220 is performed periodically by the software system 10, in response to an update request from a partner system 3, or in response to an update request or transaction completion message from the transaction device 6 involved in the off-line data transaction.

Reference numeral S7 refers to executing an on-line data transaction, using application data stored in the card database 13 of the computer system 1. In the process of executing the off-line data transaction, the program module 221 of the card emulation module 220 uses an application data pointer of the card emulation module 220 to retrieve the respective application data from the representation 14 of the card emulation module in the card database 13 of the computer system 1. Thus, application data to be transferred from the card emulation module 220 to the transaction device 6 is first retrieved via the telecommunications network 5 from the card database 13 of the computer system 1. Vice versa, application data received by the card emulation module 220 from the transaction device 6 is transferred via the telecommunications network 5 to the card database 13 of the computer system 1, where it is stored as up-to-date application data in the representation 14 of the respective card emulation module 220. Consequently, an up-to-date representation 14 of the card emulation module 220 installed in the respective mobile communication device 2 is maintained in the card database 13 by the software system 10. For on-line data transactions, depending on the embodiment, the application-specific access right data is stored with the application data pointer in the card emulation module 220 or with the application data in the representation 14 of the card emulation module in the card database 13 of the computer system 1.

It should be noted that, in the description, the computer program code has been associated with specific functional modules and the sequence of the steps has been presented in a specific order, one skilled in the art will understand, however, that the computer program code may be structured differently and that the order of at least some of the steps could be altered, without deviating from the scope of the invention.

The invention claimed is:

1. A system for managing application data of different contactless card applications for a plurality of mobile communication devices, the system comprising one or more processors configured to:

transfer, via a telecommunications network to one of the mobile communication devices, a card emulation module, using an area access key for storing the card emulation module in a secured area of the mobile communication device, the card emulation module comprising computer program code configured to control a processor of the mobile communication device to emulate a first hardware-implemented contactless card such that the card emulation module emulates a processor and memory of the first hardware-implemented contactless card in order to emulate one or more functions of the first hardware-implemented contactless card, the one or more functions include interacting with an external card reader according to at least one of an NFC data transmission protocol or an RFID data transmission protocol and executing data transactions via a close range wireless communication interface of the mobile communication device;

transfer application data for at least one contactless card application via the telecommunications network to the mobile communication device for storing the application data in the card emulation module; and maintain in the system a card database, storing in the card database for each of the plurality of mobile communication devices a representation of the card emulation module stored in the respective mobile communication device, the representation of the card emulation module comprising (a) the application data content of the card emulation module stored in the respective mobile communication device and (b) information related to the computer program code of the card emulation module stored in the respective mobile communication device.

2. The system of claim 1, wherein the one or more processors of the system are further configured to transfer application-specific access right data for a plurality of contactless card applications via the telecommunications network to the mobile communication device for storing the application-specific access right data in the card emulation module, and to store in the system application-specific access keys for a plurality of contactless card applications; and the card emulation module comprises computer program code configured to control the processor of the mobile communication device to execute data transactions via the close range wireless communication interface of the mobile communication device, and to verify authorization of a transaction partner to access application data stored in the card emulation module for a particular contactless card application, based on the application-specific access right data, stored in the card emulation module for the particular contactless card application, and an application-specific access key, received from the transaction partner via the close range wireless communication interface.

3. The system of claim 1, wherein the application data stored in the card emulation module of the mobile communication device comprises a pointer to application data stored in the card database; and the card emulation module comprises computer program code configured to control the processor of the mobile communication device to retrieve the application data from the card database using the pointer, and to execute the data transactions via the close range wireless communication interface of the mobile communication device using application data retrieved from the card database.

4. The system of claim 1, wherein the one or more processors of the system are further configured to read the application data stored in the card emulation module of one of the mobile communication devices, and to execute at least one of: transferring from the system to the mobile communication device up-to-date application data stored in the card database, in cases where the application data read from the mobile communication device indicates an outdated version of the application data, and updating in the system the representation of the card emulation module of the mobile communication device by storing in the card database application data read from the card emulation module of the mobile communication device, in cases where the application data read from the mobile communication device indicates a more recent version of the application data.

5. The system of claim 1, wherein the one or more processors of the computer system are further configured to receive via the telecommunications network a request related to a contactless card application for performing at least one of the following application data operations for the card emulation module of one or more mobile communication devices: download additional application data into the card emulation module, update application data in the card emulation module, and delete application data in the card emulation module; to transfer an application data request to the card emulation module of the one or more mobile communication devices according to the respective application data operation; and to update in the card database the representation of the card emulation module of the one or more mobile communication devices by updating application data in the card database according to the application data request.

6. The system of claim 1, wherein the one or more processors of the computer system are further configured to receive via the telecommunications network from an authorized partner system at least one of: a write request including application data for the card emulation module of one or more mobile communication devices, and a read request for reading application data from the card emulation module of one or more mobile communication devices; to transfer the application data via the telecommunications network to the card emulation module of the one or more mobile communication devices, in case of a write request; and to read the application data stored in the card emulation module of the one or more mobile communication devices, in case of a read request; and to update in the system the representation of the card emulation module of the one or more mobile communication devices by storing in the card database the application data read or stored in the card emulation module of the one or more mobile communication devices, respectively.

7. The system of claim 1, wherein the one or more processors of the computer system are further configured to receive via the telecommunications network a request related to one of the mobile communication devices, the request demanding an update to the card emulation module; to transfer program code for the card emulation module to the mobile communication device according to the request; and to update in the card database the representation of the card emulation modules of the mobile communication devices by storing in the card database at least one of: a version number indicating the version of the program code transferred to the mobile communication device, and the program code transferred to the mobile communication device.

8. The system of claim 1, wherein the card emulation module comprises computer program code configured to control a processor of the mobile communication device to execute the data transaction via the close range wireless communication interface of the mobile communication device with an external transaction device, the data transaction including at least one of: a debit payment transaction, a credit payment transaction, an electronic cash payment transaction, a ticketing transaction, an access control transaction, an application update transaction for updating the application data in the card emulation module, and a card update transaction for updating the computer program code of the card emulation module; and the application data including at least one of: debit account data, credit account data, electronic cash data, electronic ticket data, access right data, user identification data, user authentication data, and application data structure data.

9. A computer-implemented method of managing application data of different contactless card applications for a plurality of mobile communication devices, the method comprising:

transferring, by a computer system via a telecommunications network to one of the mobile communication devices, a card emulation module, using an area access key for storing the card emulation module in a secured area of the mobile communication device, the card emulation module comprising computer program code configured to control a processor of the mobile communication device to emulate a first hardware-implemented contactless card such that the card emulation module emulates a processor and memory of the first hardware-implemented contactless card in order to emulate one or more functions of the first hardware-implemented contactless card, the one or more functions include interacting with an external card reader according to at least one of an NFC data transmission protocol or an RFID data transmission protocol and executing data transactions via a close range wireless communication interface of the mobile communication device;

transferring by the computer system via the telecommunications network to the mobile communication device application data for at least one contactless card application for storing the application data in the card emulation module; and maintaining in the computer system a card database, storing in the card database for each of the plurality of mobile communication devices a representation of the card emulation module stored in the respective mobile communication device, the representation of the card emulation module comprising (a) the application data content of the card emulation module stored in the respective mobile communication device and (b) information related to the computer program code of the card emulation module stored in the respective mobile communication device.

10. The method of claim 9, wherein the method further comprises:

the computer system transferring via the telecommunications network to the mobile communication device application-specific access right data for a plurality of contactless card applications;

storing the application-specific access right data in the card emulation module;

storing in the computer system application-specific access keys for a plurality of contactless card applications; and the computer system transferring via the telecommunications network to the mobile communication device a card emulation module which includes computer program code configured to control the processor of the mobile communication device to execute data transactions via the close range wireless communication interface of the mobile communication device, and to verify authorization of a transaction partner to access application data stored in the card emulation module for a particular contactless card application, based on the application-specific access right data, stored in the card emulation module for the particular contactless card application, and an application-specific access key, received from the transaction partner via the close range wireless communication interface.

11. The method of claim 9, wherein the method further comprises the computer system including in the application data stored in the card emulation module of the mobile communication device a pointer to application data stored in the card database; and transferring via the telecommunications network to the mobile communication device a card emulation module which includes computer program code configured to control the processor of the mobile communication device to retrieve the application data from the card database using the pointer, and to execute the data transactions via the close range wireless communication interface of the mobile communication device using application data retrieved from the card database.

12. The method of claim 9, wherein the method further comprises the computer system reading the application data stored in the card emulation module of one of the mobile communication devices, and executing at least one of: transferring from the computer system to the mobile communication device up-to-date application data stored in the card database, in cases where the application data read from the mobile communication device indicates an outdated version of the application data, and updating in the computer system the representation of the card emulation module of the mobile communication device by storing in the card database application data read from the card emulation module of the mobile communication device, in cases where the application data read from the mobile communication device indicates a more recent version of the application data.

13. The method of claim 9, wherein the method further comprises the computer system receiving via the telecommunications network a request related a contactless card application, the request indicating at least one of the following application data operations for the card emulation module of one or more mobile communication devices: download additional application data into the card emulation module, update application data in the card emulation module, and delete application data in the card emulation module; transferring an application data request to the card emulation module of the one or more mobile communication devices according to the respective application data operation; and updating in the card database the representation of the card emulation module of the one or more mobile communication devices by updating application data in the card database according to the application data request.

14. The method of claim 9, wherein the method further comprises the computer system receiving via the telecommunications network from an authorized partner system at least one of: a write request including application data for the card emulation module of one or more mobile communication devices, and a read request for reading application data from the card emulation module of one or more mobile communication devices; transferring the application data via the telecommunications network to the card emulation module of the one or more mobile communication devices, in case of a write request; and reading the application data stored in the card emulation module of the one or more mobile communication devices, in case of a read request; and updating in the computer system the representation of the card emulation module of the one or more mobile communication devices by storing in the card database the application data read or stored in the card emulation module of the one or more mobile communication devices, respectively.

15. The method of claim 9, wherein the method further comprises the computer system receiving via the telecommunications network a request related to one of the mobile communication devices, the request demanding an update to the card emulation module; transferring program code for the card emulation module to the mobile communication device according to the request; and updating in the card database the representation of the card emulation modules of the mobile communication devices by storing in the card database at least one of: a version number indicating the version of the program code transferred to the mobile communication device, and the program code transferred to the mobile communication device.

16. The method of claim 9, wherein the method further comprises the computer system transferring via the telecommunications network to the mobile communication devices a card emulation module which includes computer program code configured to control a processor of the mobile communication device to execute the data transaction via the close range wireless communication interface of the mobile communication devices with an external transaction device, the data transaction including at least one of: a debit payment transaction, a credit payment transaction, an electronic cash payment transaction, a ticketing transaction, an access control transaction, an application update transaction for updating the application data in the card emulation module, and a card update transaction for updating the computer program code of the card emulation module; and the application data including at least one of: debit account data, credit account data, electronic cash data, electronic ticket data, access right data, user identification data, user authentication data, and application data structure data.

17. A computer program product comprising a non-transient computer readable medium having stored thereon computer program code configured to control a processor of a computer system to perform:
 transferring, from the computer system via a telecommunications network to one of the mobile communication devices, a card emulation module, using an area access key for storing the card emulation module in a secured area of the mobile communication device, the card emulation module comprising computer program code configured to control a processor of a mobile communication device to emulate a first hardware-implemented contactless card such that the card emulation module emulates a processor and memory of the first hardware-implemented contactless card in order to emulate one or more functions of the first hardware-implemented contactless card, the one or more functions include interacting with an external card reader according to at least one of an NFC data transmission protocol or an RFID data transmission protocol and executing data transactions via a close range wireless communication interface of the mobile communication device;
 transferring from the computer system via the telecommunications network to the mobile communication device application data for at least one contactless card application for storing the application data in the card emulation module; and
 maintaining in the computer system a card database, by storing in the card database for each of the plurality of mobile communication devices a representation of the card emulation module stored in the respective mobile communication device, the representation of the card emulation module comprising (a) the application data content of the card emulation module stored in the respective mobile communication device and (b) information related to the computer program code of the card emulation module stored in the respective mobile communication device.

\* \* \* \* \*